United States Patent Office 3,041,773
Patented July 3, 1962

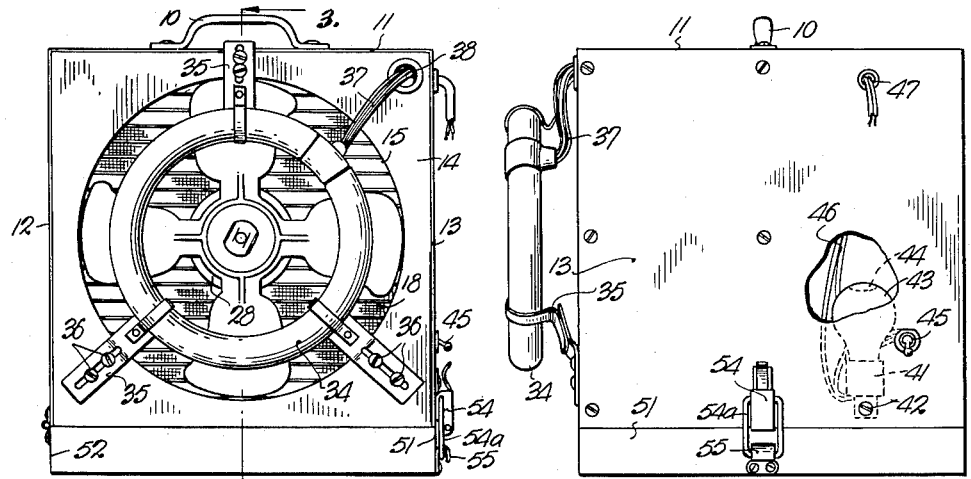
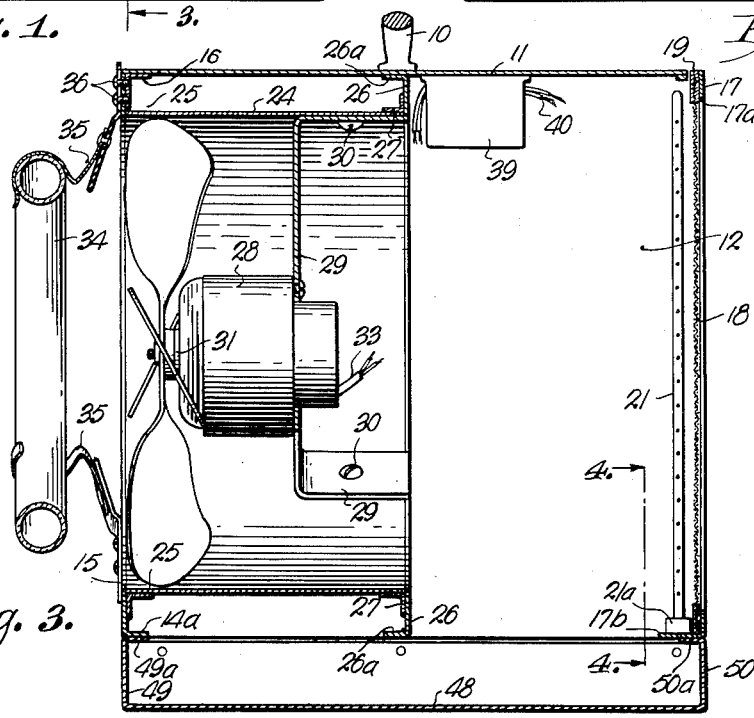
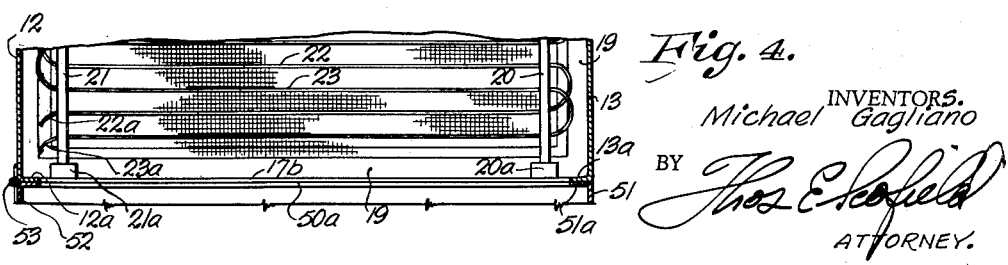

3,041,773
INSECT ATTRACTING AND KILLING DEVICE
Michael Gagliano, Kansas City, Mo., assignor to Lenmike Corporation, Kansas City, Mo., a corporation of Missouri
Filed Feb. 13, 1959, Ser. No. 793,052
2 Claims. (Cl. 43—139)

This invention relates to devices for both attracting and killing insects and refers more particularly to such a device utilizing, in combination, an attracting light, a fan for drawing the insects into the device and, optionally, electrical means for both killing and at least partially cremating said insects, novel means also being provided for storage and removal of the dead insects.

Previously, many devices of many types have been provided for attracting insects, killing insects and both in combination. Various types of lights have been provided for attracting the insects. Fans have been previously employed to draw insects into boxes of various sorts to either trap them or kill them. Electrical means of various sorts are known for the electrocution and cremation of insects. However, no single unitary means have been heretofore provided which efficiently attract insects from a large area, optionally passes the insects back to an electrical killing and cremation screen of large area, while providing means for removing the killed and cremated insects from the working area of the device and also permitting ready removal of any remains of the insects from the device at predetermined intervals.

Therefore, an object of the invention is to provide a unitary, convenient, relatively inexpensive device for efficiently attracting flying insects, drawing them into an enclosed space, passing them in controlled fashion backwardly to electrical killing and cremating means, and then passing the insect remains to a convenient storage space from which they are readily and conveniently removed.

Another object of the invention is to provide such a device which may be combined with a chemical circulating bulb with which to saturate a space or volume with a chemical or chemicals for killing nonflying insects.

Another object of the invention is to provide such a device which conveniently may be employed with a light bright enough to read by whereby to both light and clear of insects a porch, a patio or the like.

Another object of the invention is to provide a device with such a volume and capacity as to enable large outside areas and spaces to be cleaned of flying insects for a measurable period, such as orchards, entrance ways, sidewalk zones, outside party areas, porches and the like.

Another object of the invention is to provide such a device which employs an electrical killing and cremating device, yet which is safe in that the electrical means is completely protected from outside contact and inadvertent contact by individuals.

Another object of the invention is to provide such a device wherein all of the parts are readily accessible for cleaning, replacement or repair.

Another object of the invention is to provide such a device which may be suspended either outside or inside a building for cleaning insects out of or removing insects from an area which may be emptied and serviced from below without removing it from its suspensions.

Still another object of the invention is to provide such a device which is extremely efficient in operation, relatively easy and cheap to manufacture, easy to service and maintain and which has a long life under constant and continued use.

Other and further objects of the invention will appear in the course of the following description thereof.

In the drawings, which form a part of the instant invention and are to be read in conjunction therewith, an embodiment of the invention is shown and, in the various views, like numbers are employed to indicate like parts.

FIG. 1 is a front view of a device embodying the invention.

FIG. 2 is a side view with parts cut away and shown in dotted lines for purpose of better illustrating the invention.

FIG. 3 is a view taken along the line 3—3 of FIG. 1 in the direction of the arrows.

FIG. 4 is a view taken along the line 4—4 of FIG. 3 in the direction of the arrows.

Referring to the drawings, the numeral 10 refers to a handle fixed to the top wall 11 of the device. Side walls 12 and 13 are attached to top wall 11 and have their lower edges turned under as at 12a and 13a. Front wall 14 has circular opening 15 centrally thereof and is circumferentially fixed to the top, side and bottom walls. Angle 16 (FIG. 3) serves to fix the front wall 14 to the top wall 11, while the lower portion of the front wall is inwardly and under-turned as at 14a. The rear wall 17 has an opening 17a centrally thereof and is fixed to the side walls 12 and 13. The lower edge of rear wall 17 is turned under as at 17b. Rear wall 17 is spaced away from the upper wall 11 in the upper portion thereof whereby the circumferential frame 19 of screen 18 can be slid into and out of the box in front of the wall 17 to fill opening 17a.

A pair of rods 20 and 21 are mounted by posts 20a and 21a on horizontal rear wall portion 17b, respectively, and extend upwardly the height of screen 18, when the latter is inserted in the box. Poles 20 and 21 are of plastic or other electrical insulating material and receive electricity conducting wires 22 and 23 therebetween. The lead-ins 22a and 23a of wires 22 and 23 are connected to any conventional source of alternating electrical current, such as a house plug, whereby to provide a constant circuit therein when the device is in operation. The wires 22 and 23 are not insulated between the posts but are insulated outside thereof. Thus any insect which contacts two of the wires between the posts will complete the circuit and be electrocuted and at least partially incinerated.

A cylindrical conduit 24 is mounted within the container defined by the walls thereof with one end fixed circumferentially to opening 15 in front wall 14 and the other facing toward opening 17a in the rear wall 17. A first continuous circumferential right-angled flange 25 sealingly connects the forward end of the conduit 24 to front wall 14, while a second continuous circumferential angled flange 26 attached to the top and side walls of the box is fixed by yet a third continuous circumferential angled flange 27 to the other end of conduit 24. The outer face 26a of flange 26 is fixed in its uppermost portion to the underside of top wall 11, the lowermost portion thereof extending laterally in line with portions 14a and 17b of front and rear walls 14 and 17, respectively. A prime mover or electric motor 28 is fixed by a plurality of spacing brackets 29 and screws or bolts 30 centrally of the conduit. Motor 28 drives shaft 31 in rotation (counterclockwise in FIG. 1) upon which is mounted fan blades 32. Preferably, the diameter of the fan blades is only slightly less than the inner diameter of the conduit 24. Electric power line 33 furnishes power to the motor 28.

A circular tubular fluorescent lamp 34 is removably received in clamping brackets 35 which are fixed to the front wall 14 by screws or bolts 36. Wiring for the lamp 34 is shown at 37 passing in through sealing fitting 38 to transformer 39 fixed to the underside of top wall 11, from whence power source lines 40 may be taken from any convenient opening in one of the walls of the device.

A socket 41 is fixed to the side wall 13 by screw or bolt 42 and receives either a conventional electrical bulb (not shown) therein or another type of conventional bulb 43 having a depression 44 in the upper end thereof for receipt of a fumigating liquid of conventional type to be vaporized by the heat of the bulb and distributed by the fan blast. Switch 45 controls bulb 43 and power lines 46 are brought out of sealed fittings 47 in side wall 13. Bulb 43 serves as an attracting illuminating source at the rear of the device to bring winged insects from the area in the rear of the box to a position where they will be attracted by the front fluorescent bulb 34.

A bottom tray is provided having a lower wall 48, front and rear walls 49 and 50, respectively, and side walls 51 and 52, respectively. The upper edge of each vertical wall of the tray is crimped or bent over as at 49a, 50a, 51a and 52a, whereby to underlie and abut against the under-turned vertical wall portions 12a, 13a, 14a and 17b, respectively, of the upper portion of the box. The vertical walls 52 and 12 are hinged as at 53, while vertical walls 51 and 13 receive conventional lever and catch locking means 54. The tray underlies the entire upper box portion and seals against the under-turned lower edges of the vertical walls of the upper box portion whereby to provide a receiving space or volume under the upper operative portion of the box. By unlatching lock 54, whereby the arm 54a thereof releases catch 55 mounted on vertical wall 51 of the tray, the hinged bottom may be swung open to dump the insect bodies and insect body remains therefrom.

In operation, with the power lines to the fluorescent lamp 34, the fan motor 28, and bulb 43 connected to a suitable electrical power source or outlet, the box or container may be suspended in the air or otherwise positioned in an area to be freed of winged insects. If the space is a closed room, a fumigating substance may be placed in the depression 44 of bulb 43 to also accomplish such purpose. With light 34 turned on and, optionally, bulb 43, insects from a surprisingly large area will be attracted to the front side of the device and fly toward and strike the bulb 34. The blades of the fan are preferably positioned next to the bulb, rather than away from the bulb, whereby to provide the greatest suction into the box. Any insect which strikes the bulb 34, provided the fan is driven with sufficient speed, will be drawn into the machine. The size of the bulb 34 is preferably such that it has a lesser outer diameter than the inside diameter of conduit 24. Thus any insect which hits any portion (including the periphery) of the bulb 34 will be drawn into the conduit 24. On the other hand, if the bulb 34 is of an outer diameter greater than the conduit inside diameter, insects hitting the periphery of the bulb may escape. Electric power is also passed to the wires 22 and 23 which are mounted in alternate spaced array on the posts 20 and 21. Insects which are blown in the blast of air from the fan blades to the screen 18 contact adjacent wires and are killed and, generally, incinerated. The electrical killing apparatus shown mounted on posts 20 and 21 is preferred, but optional, as we have found that insects will be trapped and killed solely by the whirling fan blades and their impact on screen 18. However, the electrocuting means aid additionally in partly or wholly incinerating the insect bodies and reduces the bulk in the receiving tray, thus increasing its capacity. Insects which inadvertently are not killed by the whirling fan blades or the electrified wires are trapped against the screen 18 and, either eventually killed by the air blast or by the velocity with which they strike the screen. The screen 18 is of sufficiently small mesh to prevent passage of the insects therethrough. The spacing of the wires 22 and 23 may be varied but, optimally, are approximately ¼" apart. There is no restriction whatsoever to the movement of the air through the box as opening 17a is of greater area than and positioned in line with conduit 24, whereby an extremely high air velocity is maintained with no back pressure on the fan, thus creating a powerful draft to suck the insects into the housing.

A source of light may be employed other than the circular fluorescent bulb. However, the latter type bulb is an improvement and preferred. The movement of the air through the housing also draws the fumigant fluid in vapor form from the depression 44 in light bulb 43 and passes it rearwardly of the housing whereby to distribute it into the area.

The receiving tray is a major inventive feature of the device and provides a maximum amount of storage space while taking up a minimum space and increasing the overall size of the entire device to a minimum degree. As the air blast is moving at a very high velocity through the housing or box, it is desirable to provide a receptacle for the insect remains and bodies which takes up a minimum space itself, yet which is sufficiently out of the main path of the blast and also positions a maximum amount of the insect remains and bodies out of the blast whereby there will be no agitation or sucking up thereof by the blast. We have found that the first insects which have either been partly incinerated or simply killed and fall down from the screen 18 or wires 22 and 23, drop into the portion of the tray to the rear of the conduit 24. However, as the insect remains fill up the tray, there are sufficient circulating air currents perhaps caused by flanges 17b and 50a to cause the insect remains to be moved back under conduit 24 whereby to provide additional space in the area to the rear of the conduit 24 for newly arrived remains. However, such air currents are not of sufficient force to move the insect remains up into the body of the box around the outside portion of the conduit 24. The under-turned edges of the upper box walls and the over-turned upper edges of the tray walls aid also in retaining the insect remains and bodies in the tray without movement upwardly into the box proper.

Thus, as the killing and attracting process continues, the tray will gradually fill up over an evening's time or even a whole night, whereby, finally, the tray will be full. The insect bodies then commence to pile up in the zone to the rear of the conduit 24. When this is the case, as soon as the heap of insect remains passes above the lip of the conduit 24, the upper remains are moved rearwardly by the blast and contact the lowermost wires 22 and 23 thus to be completely incinerated and passed out as fine dust through the screen 18. It is therefore unusual for the box to become excessively full as there will be a constant incineration process going on once the tray becomes full.

When the insect killing process has been performed over a desired period of operation, the latch 54 may be released and the tray bottom opened downwardly to dump its contents into a suitable receptacle. It should be noted that, if the box is suspended in the air, this emptying process can be carried out without removing the box from its hanging position. As the tray can be entirely inverted, all of the remains can be easily and conveniently removed therefrom and then the tray returned to the position of the drawings.

Switches are not illustrated for anything but the light 43, although separate electrical source cords or switches can be conveniently provided to separately control the killing circuit, motor, etc. A switching arrangement may also be employed where the user can employ only the light or only the fan alternatively.

From the foregoing it will be seen that this invention is one well adapted to attain all of the ends and objects hereinabove set forth together with other advantages which are obvious and which are inherent to the structure.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

Having thus described my invention, I claim:

1. Apparatus for attracting, trapping, killing and storing winged insects comprising an elongate hollow casing having front, rear, side, top and bottom walls enclosing a volume of space, a relatively short fan conduit housed in and adjacent one end of the casing, penetrating the front wall thereof and running at least substantially axially of said casing, said fan conduit of substantially lesser length than the axial length of said casing whereby the conduit overlies only a portion of the floor of said casing at the front thereof, an insect attracting light mounted adjacent the end of said conduit next the end of said casing and outside thereof, a fan mounted in said conduit adapted to blow air into said casing and out the rear wall thereof, at least a portion of the rear wall of said casing opposite said conduit and in a line with the air blast therefrom screened to permit egress of air but not insects therethrough, the screened end of the casing opposite said conduit of at least as great area as said conduit whereby to minimize turbulence in exit of the fan blast from said casing, electrical means positioned within the casing in front of said screen for killing insects, said electrical means extending across at least substantially the entire area of said screen, and an insect receiving tray forming the bottom wall of said casing underlying the entire casing body including said fan conduit and electrical killing means and entirely positioned below and out of the direct line of the fan blast.

2. Apparatus as in claim 1 including a substantially horizontally positioned flange fixed to one of the top edge of said insect receiving tray and the side walls of the casing and extending substantially circumferentially thereto whereby to tend to retain insects in said tray despite any turbulent agitation of said air blast.

References Cited in the file of this patent
UNITED STATES PATENTS

| | | |
|---|---|---|
| 473,920 | Edwards | May 3, 1892 |
| 738,184 | Goodwin | Sept. 8, 1903 |
| 1,486,307 | Seefluth et al. | Mar. 11, 1924 |
| 1,807,076 | Sweet | May 26, 1931 |
| 1,807,550 | Rector | May 26, 1931 |
| 2,159,618 | Lindsley | May 23, 1939 |
| 2,780,026 | Dail et al. | Feb. 5, 1957 |
| 2,799,116 | Leftwich | July 16, 1957 |
| 2,806,321 | Blackman | Sept. 17, 1957 |
| 2,807,116 | Finley | Sept. 24, 1957 |